United States Patent
Haubelt et al.

(10) Patent No.: US 10,601,571 B2
(45) Date of Patent: Mar. 24, 2020

(54) METHOD FOR ADJUSTING TIME STAMPS DURING THE ACQUISITION OF SENSOR DATA

(71) Applicant: Robert Bosch GmbH, Stuttgart (DE)

(72) Inventors: Christian Haubelt, Kritzmow (DE); Rainer Dorsch, Kirchentellinsfurt (DE); Sebastian Stieber, Rostock (DE); Shengxian Liu, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/038,961

(22) Filed: Jul. 18, 2018

(65) Prior Publication Data

US 2019/0028261 A1  Jan. 24, 2019

(30) Foreign Application Priority Data

Jul. 19, 2017 (DE) .......... 10 2017 212 353

(51) Int. Cl.
| | |
|---|---|
| H04L 7/00 | (2006.01) |
| H04Q 9/00 | (2006.01) |
| H04J 3/06 | (2006.01) |
| H04L 7/04 | (2006.01) |
| H04L 7/08 | (2006.01) |
| H04L 12/40 | (2006.01) |

(52) U.S. Cl.
CPC .......... *H04L 7/0012* (2013.01); *H04J 3/0638* (2013.01); *H04L 7/0037* (2013.01); *H04L 7/042* (2013.01); *H04L 7/08* (2013.01); *H04Q 9/00* (2013.01); *H04L 12/40* (2013.01); *H04Q 2209/753* (2013.01)

(58) Field of Classification Search
CPC ....... H04L 7/0008; H04L 7/02; H04L 7/0331; H04L 7/08; A63B 2230/75; G08G 1/0967
USPC ........................................................ 375/354
See application file for complete search history.

(56) References Cited

U.S. PATENT DOCUMENTS

| | | | |
|---|---|---|---|
| 8,803,913 B1 * | 8/2014 | Edmonston | G06T 7/20 345/629 |
| 2014/0286621 A1 * | 9/2014 | Matsunaga | G11B 27/10 386/241 |
| 2017/0055918 A1 * | 3/2017 | Hughes | A61B 5/1123 |
| 2018/0246570 A1 * | 8/2018 | Coleman | A61B 5/0006 |

* cited by examiner

*Primary Examiner* — Khai Tran
(74) *Attorney, Agent, or Firm* — Norton Rose Fulbright US LLP; Gerard Messina

(57) ABSTRACT

A method for synchronizing sensor data of a sensor system with the host time base of a host system, based on the clock ratio of the sensor time base to the host time base. To ascertain the clock ratio for at least two communication events, a time stamp acquisition is performed for each event, in which a sensor time stamp and a host time stamp is recorded. The communication events for ascertaining the clock ratio relate to a specific quantity of data. The ratio is ascertained/updated repeatedly; the duration of the individual communication events for the time stamp acquisition are measured; and by comparing each measured duration to a comparison value, possible irregularities in the communication event are detected. The host time stamp of a time stamp acquisition is corrected/replaced by a calculated host time stamp based on the measured irregularities. Also described is a related device for the method.

8 Claims, 3 Drawing Sheets

METHOD FOR ADJUSTING TIME STAMPS DURING THE ACQUISITION OF SENSOR DATA

RELATED APPLICATION INFORMATION

The present application claims priority to and the benefit of German patent application no. 10 2017 212 353.2, which was filed in Germany on Jul. 19, 2017, the disclosure which is incorporated herein by reference.

FIELD OF THE INVENTION

The present invention relates to a device and a method for adjusting time stamps during the acquisition of sensor data.

BACKGROUND INFORMATION

Measured sensor data of different sensor systems, such as inertial, camera and acoustic sensors, are provided with time stamps, in order to be able to selectively link and process the measurement data. The different sensor systems are normally operated by different, respective, internal clock generators. Therefore, there is no synchronism between the sensor systems. Each system may operate with different accuracy and at a frequency variable over time. In particular, if the sensor data on the specific sensor system are collected in a FIFO (first input first output) data structure, the classification of the measured sensor data of different sensor systems is made more difficult later on. Therefore, the time stamps of the individual sensor systems are brought onto a common time base by a superordinate entity, for example, a sensor hub, an application processor of a mobile device, or a host system, in order to allow a relation of individual sensor data to each other. This temporal synchronization of sensor data may be achieved by different methods. For example, the clock generators of the sensor systems may be adjusted in their frequency. In addition, possible frequency differences between sensor systems may be ascertained and subsequently used by a host system for adjusting the time stamps. However, these options for synchronization only function, if resource conflicts may be disregarded. Otherwise, various influences not considered, such as temperature, may lead to falsification in the adjustment of the time base of different sensor systems.

SUMMARY OF THE INVENTION

An objective forming the basis of the present invention may be seen as proposing a method for detecting and correcting temporal anomalies in communication events between sensor systems and host systems.

This object may be achieved with the aid of the subject matter of the descriptions herein. Advantageous embodiments of the present invention are the subject matter of the further descriptions herein.

According to one aspect of the present invention, a method for synchronizing sensor data of at least one sensor system with the host time base of a host system is provided. The synchronization is accomplished on the basis of the clock ratio of the sensor time base of the at least one sensor system to the host time base of the host system. To ascertain the clock ratio of the host system to the at least one sensor system for at least two communication events, in each instance, a time stamp acquisition is carried out, in which a sensor time stamp of the respective sensor time base and a host time stamp of the respective host time base are recorded. All of the communication events for ascertaining the clock ratio relate to a specific quantity of data, the clock ratio being ascertained and updated repeatedly. According to the present invention, in each instance, the duration of the individual communication events for the time stamp acquisition is measured; by comparing each measured duration of a communication event to a comparison value, possible irregularities in this communication event being able to be detected.

Sensor data of at least one sensor system are measured and transmitted to the host system via at least one communication link. The host system may be, for example, an application processor or a sensor hub. The communication link may be, for example, an I²C or SPI interface. Alternatively, or in addition, the at least one sensor system may be connected to the host system via an indirect communication link. The at least one sensor system may communicate with the host system, for example, via one or more microcontrollers, in a wire-conducted and/or wireless manner. Possible sensor systems may include, for example, MEMS inertial sensors, camera sensors, acoustic sensors, temperature sensors, pressure sensors and the like. In this connection, the sensor systems are suitable for making their respective, current time information available to the host system, for example, in the form of a counter. Since, in principle, both sensor systems and the host system may be faulty, different time bases are produced for the specific systems. These differences may be further amplified by external influences and aging processes. For example, a change in a temperature of a system may have an effect on a frequency of a system and, consequently, on the corresponding time base, as well. Through this, in particular, frequencies and the time bases of different systems may change relative to each other.

The sensor data measured by the sensor systems may be read out by the host system, together with the respective sensor time. This may take place both via a FIFO interface and in the form of direct data register access. The host system may measure a total access time and/or a duration of a communication event with at least one sensor system, carried out via a communication link. At the beginning of a communication event, a starting time stamp is generated and stored by the host system. After a successfully completed data transmission and/or at the end of the communication event, an ending time stamp is generated by the host system. The host system may measure or calculate a duration of the communication event on the basis of the starting time stamp and the ending time stamp. A measured duration of a communication event may subsequently be compared to a comparison value. By comparing a duration of a communication event to a comparison value, possible irregularities in this communication event may be identified. For example, reference values may be ascertained as comparison values for a duration of a communication event. For example, in the case of a minimum capacity utilization of the host system, communication events may be suitable as a reference for a comparison. One or more comparison values for a duration may also be determined from a plurality of different communication events. Consequently, delays in the communication events caused, for example, by resource conflicts may be detected.

According to one specific embodiment of the present invention, the duration of at least one communication event is measured for the time stamp acquisition; the comparison value being determined on the basis of this at least one measured value for the communication duration. In this connection, a duration of a current communication event or of one or of several communication events last carried out may be used for determining a comparison value. Therefore, the communication event last carried out may be compared to one or more previous communication events. In this manner, the communication events last carried out may be checked, using previous communication events. Thus, in particular, differences may be identified and subsequently corrected, for example, by adjusting the corresponding time stamps.

According to one further specific embodiment of the present invention, the duration of the communication events is measured regularly for the time stamp acquisition; the comparison value determining and regularly updating a communication duration on the basis of a plurality of values measured in this manner. By including a plurality of communication events for ascertaining a comparison value for a communication duration, slight irregularities and differences may be compensated for. The comparison value may be ascertained, for example, after every executed communication event, in specific time intervals or after a certain number of communication events.

According to one further advantageous specific embodiment of the present invention, an average communication duration or a minimum communication duration is determined as a comparison value. In the course of several implemented communication events, an average or a mean duration of a communication event may be calculated and set as a comparison value. Afterwards, the average duration of such a communication event may be compared to subsequent measurements of the specific duration of the communication event. An occurring difference of the measured duration from the average communication duration may indicate a resource conflict occurring during a reading event of the sensor data. In this connection, the calculation of the average communication duration of a communication event may be carried out regularly or irregularly, so that the average communication duration may be updated in specific time intervals. If a difference of a measured duration of a communication event from an average communication duration is able to be determined, the host system may adjust the generated time stamp on the basis of the average duration of a communication event. Through this, a variance in the duration of different communication events may be minimized. In addition this may allow negative influences on a synchronization of measured sensor data with the host system, in the form of hardware and/or software delays, to be detected and compensated for. Thus, on the whole, a higher accuracy of the assigned time stamps of the communication event may be achieved, which results in a higher accuracy in a fusion of sensor data and the algorithms and calculations based on it. In this case, the average communication duration must not automatically be defined in the form of a mathematical mean. As an alternative, the comparison value may also be determined on the basis of a minimum communication duration. To this end, for example, a minimum communication duration may be ascertained from a plurality of past communication durations.

According to one further specific embodiment of the present invention, an irregularity in a communication event for time stamp acquisition is detected, if the measured duration of this communication event differs from the comparison value and lies outside of a specifiable tolerance range. If a difference of the communication duration from the comparison value goes beyond the tolerance range, an irregularity in this communication event may be ascertained. In this manner, small fluctuations in a duration of a communication link may remain unconsidered and reduce correction expenditure and/or computing expenditure. Through this, natural fluctuations and irregularities of the systems, such as background noise, may be suppressed.

According to a further advantageous specific embodiment of the present invention, the host time stamp of a time stamp acquisition may be corrected and/or replaced by a calculated host time stamp, if an irregularity in the communication event of this time stamp acquisition is detected. The relative temporal ratios of sensor systems to host systems may be flawed due to various resource conflicts, such as scheduling decisions of the host system or delays in a host system/sensor system communication. An erroneous calculation of the time stamps of single or a plurality of sensor events and/or communication events results from this. In the case of a fault in the host system, time stamps of all of the sensor systems connected to the host system are affected by an incorrect temporal association. One or more time stamps of at least one current communication event may be corrected to the effect, that a time difference between at least one sensor system and the host system is reduced or eliminated. Instead of correcting a time stamp set by the host system, a new time stamp may be set, which replaces the previous incorrect time stamp. For example, additional information regarding an incorrect time stamp may be stored, so that in the case of further processing of the sensor data, it remains unconsidered. Alternatively, an incorrect time stamp may be deleted and replaced by a corrected, new time stamp.

According to a further specific embodiment of the present invention, during the determination of the clock ratio of the sensor time base of the at least one sensor system to the host time base of the host system, the contributions of the individual time stamp acquisitions are weighted; this weighting being carried out as a function of the measured duration of the underlying communication event. Alternatively, or in addition to direction correction of, or compensation for, the time stamps, a weighting factor may be calculated as a function of the ascertained difference. The weighting factor may be implemented, for example, in the form of a quotient of a duration of a current communication event and the average duration of a communication event.

According to a further specific embodiment of the present invention, the contribution of a time stamp acquisition is only weighted, if an irregularity in the communication event of this time stamp acquisition is detected; to that end, a weighting factor being determined on the basis of the difference of the currently measured communication duration from the comparison value. Using the weighting, communication durations subject to irregularities may also be taken into account in the determination of a comparison value. In this connection, a weighting factor may be selected as a function of a magnitude of the difference of a communication duration from the comparison value. For example, a high weighting factor may be selected in response to a low difference, and a low weighting factor may be selected in response to a high difference.

According to a further aspect of the present invention, a device including devices for implementing the method of the present invention is provided. The device includes a host system having a host time basis, and at least one sensor system having a separate sensor time basis. The device includes devices for reading out the sensor time stamps, and at least one communication link between the at least one sensor system and the host system.

Such a device may be, for example, a portable device, such as a smart phone or tablet. In this connection, acceleration sensors, brightness sensors, position sensors, temperature sensors and the like may each constitute different sensor systems, which are connected to a host system via communication links. The host system may be, for example, an application processor of the unit and/or of the device, and configured to read out and to process the measured sensor data of the sensor systems. Alternatively, such a device may be an arbitrary measuring device, such as a radar system or a lidar (light detection and ranging) system. In this connection, the sensor data are retrieved by the host system in specific time intervals and passed on, stored or processed further. In the case of access of the host system to at least one sensor system, the measured sensor data, along with corresponding time data or time stamps of the sensor system, may be read out by the host system. In doing this, on the basis of the host system time, the host system may assign a starting time stamp prior to the access and an ending time stamp after a successfully terminated instance of access. With the aid of the two time stamps, the host system may calculate a duration of the access time, i.e., of a communication event, via the communication link. This is accomplished by subtracting the starting time from the ending time for each communication event. A comparison value may be calculated from communication events already carried out. The comparison value may subsequently be compared to a duration of a current or recently carried-out communication event. If a difference is detected, this may indicate a delay or an error in the synchronization between the at least one sensor system and the host system. Consequently, in the case of the communication event, in which a difference is detected, at least one time stamp may be corrected directly or indirectly, or replaced.

In the following, exemplary embodiments of the present invention are explained in greater detail in view of highly simplified, schematic representations.

In the figures, identical structural elements have, in each instance, the same reference numerals.

DETAILED DESCRIPTION

Figure 1:
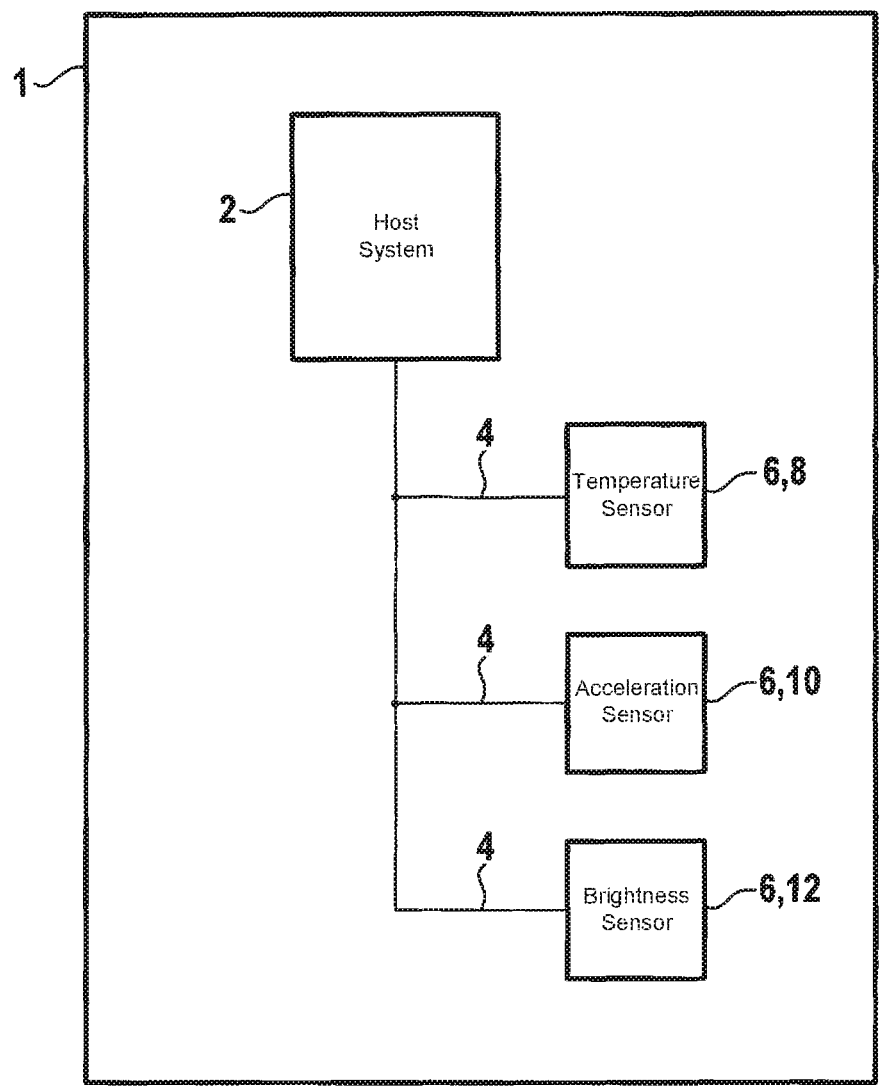
FIG. 1 shows a schematic representation of a device according to a first exemplary embodiment.

FIG. 1 shows a schematic representation of a device 1 according to a first exemplary embodiment. Device 1 includes a host system 2 in the form of an application processor 2. Host system 2 is connected to a plurality of sensor systems 6 via a plurality of communication links 4. According to the exemplary embodiment, sensor systems 6 include a temperature sensor 6, 8, an acceleration sensor 6, 10 and a brightness sensor 6, 12.

Measured sensor data 14 from sensor systems 6 are retrieved by host system 2 in regular time intervals 16, via communication links 4.

Figure 2:
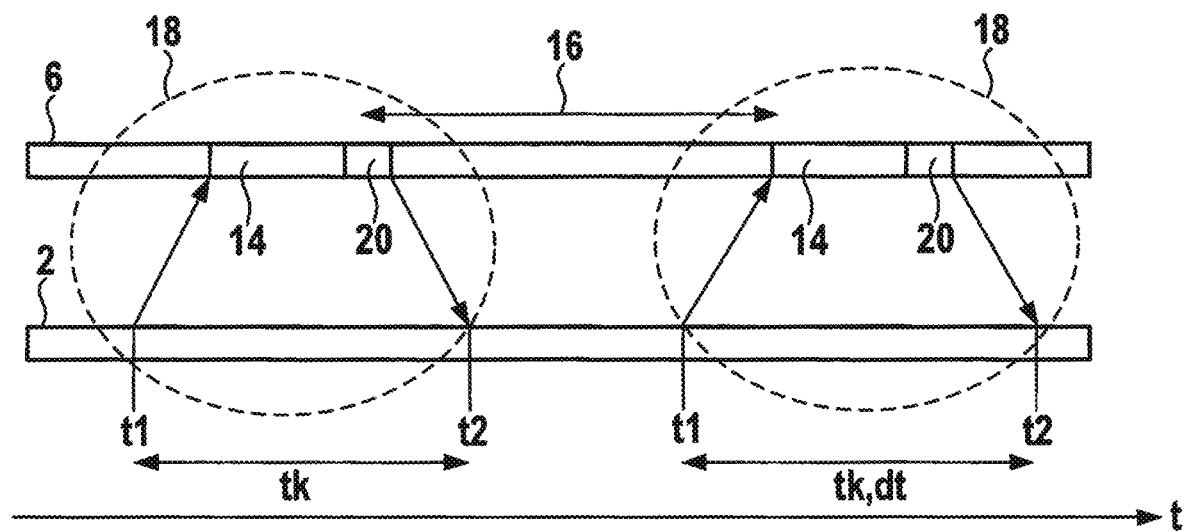
FIG. 2 shows a schematic time sequence of a communication event.

A schematic time sequence of two communication events 18 is represented in FIG. 2. In this connection, a time axis of sensor system 6 and a time axis of host system 2 are shown. In regular time intervals 16, host system 2 initiates communication events 18 for retrieving sensor data 14. In this case, sensor data 14 are, for example, measured temperature values. In addition to sensor data 14, temporal information 20 of sensor system 6 regarding respective sensor data 14 is also transmitted. At the beginning of a communication event 18, host system 2 generates a starting time stamp t1. After successful completion of communication event 18, an ending time stamp t2 is generated by host system 2. In this connection, starting time stamp t1 and ending time stamp t2 are based on a time base of host system 2. In the two communication events 18, respective duration tk of communication events 18 is calculated from starting time stamps t1 and ending time stamps t2. An average duration td of a communication event 18 may already be calculated as a comparison value tv, from two ascertained durations tk. For example, the average may be an arithmetic mean. In the case of each further communication event 18 carried out, a duration tk of communication event 18 is likewise calculated and included in the computation of average duration td of a communication event 18. With an increasing number of communication events 18 carried out, an increasingly accurate assertion regarding an average duration td of a communication event 18 may be made.

Figure 3:
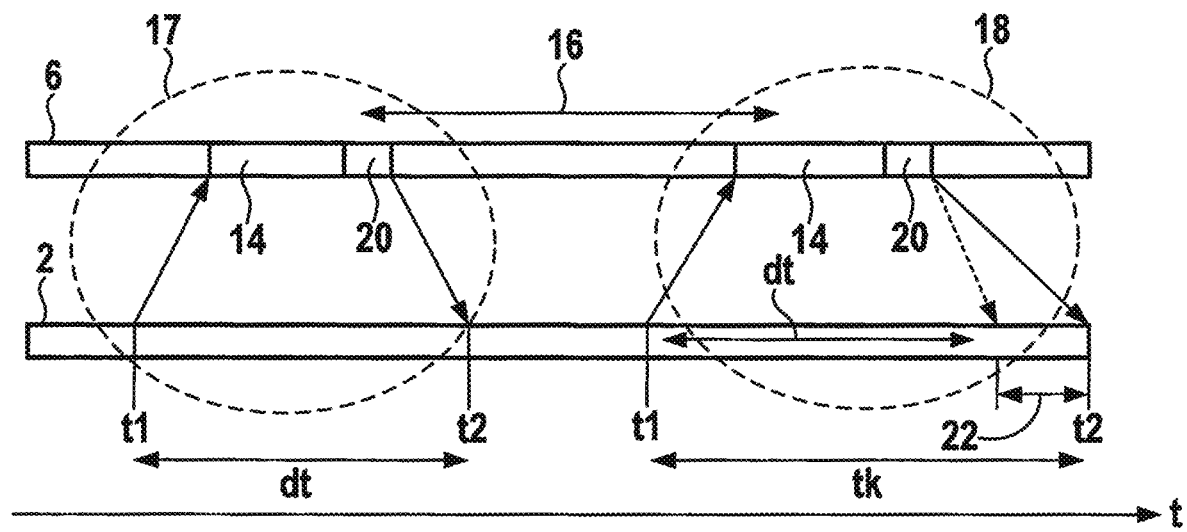
FIG. 3 shows a detected difference of a duration of a communication event according to the method as shown in the first exemplary embodiment.

FIG. 3 shows a difference 22 in a duration tk of a communication event 18 in accordance with the method as shown in the first exemplary embodiment. An average duration td in the form of a comparison value tv of a communication event 17, 18 is ascertained with the aid of the communication events 17 carried out in the past. In the case of a communication event 18 last carried out, a duration tk of communication event 18 is calculated, which is greater than average duration td, tv. Therefore, according to the exemplary embodiment, there is a temporal difference 22 and, consequently, a detected irregularity 22 in the communication event 18 last carried out. Due to difference 22, duration tk of communication event 18 is not considered in the calculation of average duration td of a communication event 17.

Figure 4:
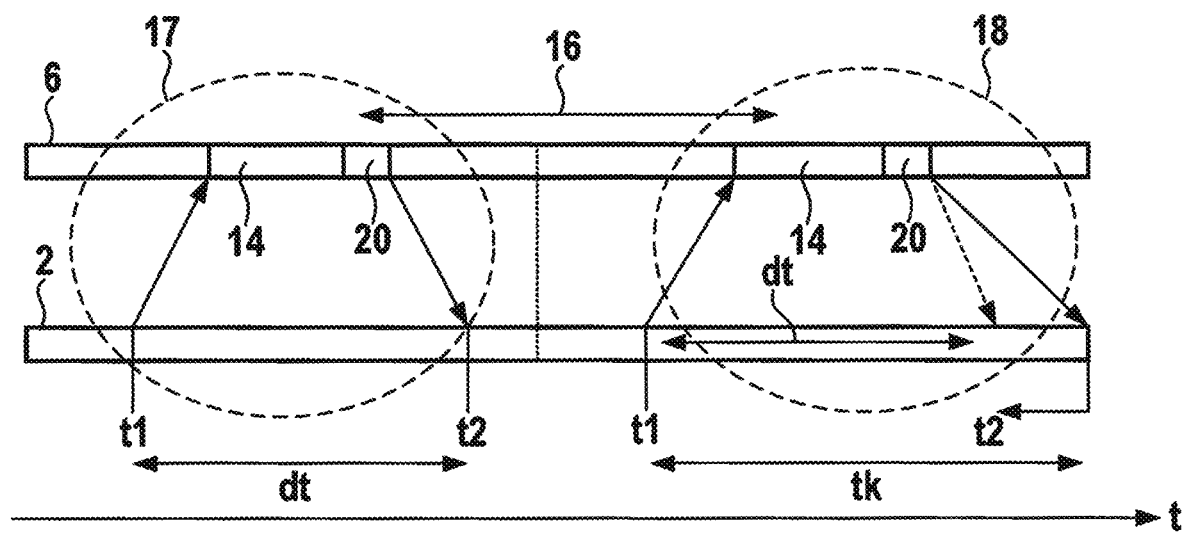
FIG. 4 shows a correction of a differing time stamp according to the method as shown in the first exemplary embodiment.

A correction of a differing ending time stamp t2 according to the method shown in the first exemplary embodiment is depicted in FIG. 4. On the basis of the difference 22 shown in FIG. 3, ending time stamp t2 is corrected in accordance with difference 22. According to the exemplary embodiment, ending time stamp t2 is shifted by a temporal magnitude of the difference 22 from host system 2, and stored.

What is claimed is:

1. A method for synchronizing sensor data of at least one sensor system with a host time base of a host system, the method comprising:
ascertaining and updating repeatedly a clock ratio of a host system to the at least one sensor system for at least two communication events, wherein, in each instance, a time stamp acquisition is performed, in which a sensor time stamp of a respective sensor time base and a host time stamp of the host time base are recorded, wherein the communication events for ascertaining the clock ratio relate to a specific quantity of data, and wherein in each instance, a duration of each of the communication events is measured for the time stamp acquisition;
comparing each measured duration of one of the communication events to a comparison value, to detect possible irregularities in the communication event; and
synchronizing the sensor data based on the clock ratio of the sensor time base of the at least one sensor system to the host time base of the host system,
wherein the duration of at least one communication event is measured for the time stamp acquisition; and the comparison value is determined on the basis of this at least one measured value for the communication duration.

2. A method for synchronizing sensor data of at least one sensor system with a host time base of a host system, the method comprising:

ascertaining and updating repeatedly a clock ratio of a host system to the at least one sensor system for at least two communication events, wherein, in each instance, a time stamp acquisition is performed, in which a sensor time stamp of a respective sensor time base and a host time stamp of the host time base are recorded, wherein the communication events for ascertaining the clock ratio relate to a specific quantity of data, and wherein in each instance, a duration of each of the communication events is measured for the time stamp acquisition;

comparing each measured duration of one of the communication events to a comparison value, to detect possible irregularities in the communication event; and synchronizing the sensor data based on the clock ratio of the sensor time base of the at least one sensor system to the host time base of the host system, wherein the duration of the communication events is regularly measured for the time stamp acquisition; and the comparison value is determined and regularly updated on the basis of a plurality of values for the communication duration measured in this manner.

3. The method of claim 1, wherein an average communication duration or a minimum communication duration is determined as the comparison value.

4. A method for synchronizing sensor data of at least one sensor system with a host time base of a host system, the method comprising:

ascertaining and updating repeatedly a clock ratio of a host system to the at least one sensor system for at least two communication events, wherein, in each instance, a time stamp acquisition is performed, in which a sensor time stamp of a respective sensor time base and a host time stamp of the host time base are recorded, wherein the communication events for ascertaining the clock ratio relate to a specific quantity of data, and wherein in each instance, a duration of each of the communication events is measured for the time stamp acquisition;

comparing each measured duration of one of the communication events to a comparison value, to detect possible irregularities in the communication event; and synchronizing the sensor data based on the clock ratio of the sensor time base of the at least one sensor system to the host time base of the host system, wherein an irregularity in a communication event for the time stamp acquisition is detected, if the measured duration of this communication event differs from the comparison value and lies outside of a specifiable tolerance range.

5. A method for synchronizing sensor data of at least one sensor system with a host time base of a host system, the method comprising:

ascertaining and updating repeatedly a clock ratio of a host system to the at least one sensor system for at least two communication events, wherein, in each instance, a time stamp acquisition is performed, in which a sensor time stamp of a respective sensor time base and a host time stamp of the host time base are recorded, wherein the communication events for ascertaining the clock ratio relate to a specific quantity of data, and wherein in each instance, a duration of each of the communication events is measured for the time stamp acquisition;

comparing each measured duration of one of the communication events to a comparison value, to detect possible irregularities in the communication event; and synchronizing the sensor data based on the clock ratio of the sensor time base of the at least one sensor system to the host time base of the host system, wherein the host time stamp of a time stamp acquisition is corrected and/or replaced by a calculated host time stamp, if an irregularity in the communication event of this time stamp acquisition is detected.

6. A method for synchronizing sensor data of at least one sensor system with a host time base of a host system, the method comprising:

ascertaining and updating repeatedly a clock ratio of a host system to the at least one sensor system for at least two communication events, wherein, in each instance, a time stamp acquisition is performed, in which a sensor time stamp of a respective sensor time base and a host time stamp of the host time base are recorded, wherein the communication events for ascertaining the clock ratio relate to a specific quantity of data, and wherein in each instance, a duration of each of the communication events is measured for the time stamp acquisition;

comparing each measured duration of one of the communication events to a comparison value, to detect possible irregularities in the communication event; and synchronizing the sensor data based on the clock ratio of the sensor time base of the at least one sensor system to the host time base of the host system, wherein during the determination of the clock ratio of the sensor time base of the at least one sensor system to the host time base of the host system, the contributions of the individual time stamp acquisitions are weighted; and this weighting is carried out as a function of the measured duration of the underlying communication event.

7. The method of claim 6, wherein the contribution of a time stamp acquisition is only weighted, if an irregularity in the communication event of this time stamp acquisition is detected; and to that end, a weighting factor is determined on the basis of the difference of the currently measured communication duration from the comparison value.

8. A device, comprising:

a host system having a host time basis;

at least one sensor system having a separate sensor time basis and having reading devices for reading out the sensor time stamps; and at least one communication link between the at least one sensor system and the host system a synchronizing device configured to synchronize the sensor data of the at least one sensor system with the host time base of the host system, by performing the following:

ascertaining and updating repeatedly a clock ratio of the host system to the at least one sensor system for at least two communication events, wherein, in each instance, a time stamp acquisition is performed, in which a sensor time stamp of a respective sensor time base and a host time stamp of the host time base are recorded, wherein the communication events for ascertaining the clock ratio relate to a specific quantity of data, and wherein in each instance, a duration of each of the communication events is measured for the time stamp acquisition;

comparing each measured duration of one of the communication events to a comparison value, to detect possible irregularities in the communication event; and synchronizing the sensor data based on the clock ratio of the sensor time base of the at least one sensor system to the host time base of the host system, wherein a total access time of the at least one communication event is measured for the time stamp acquisition.

* * * * *